July 28, 1953 U. M. W. BARSKE 2,646,999
FLUID SEAL
Filed Jan. 19, 1949 2 Sheets-Sheet 1
Fig. 1.
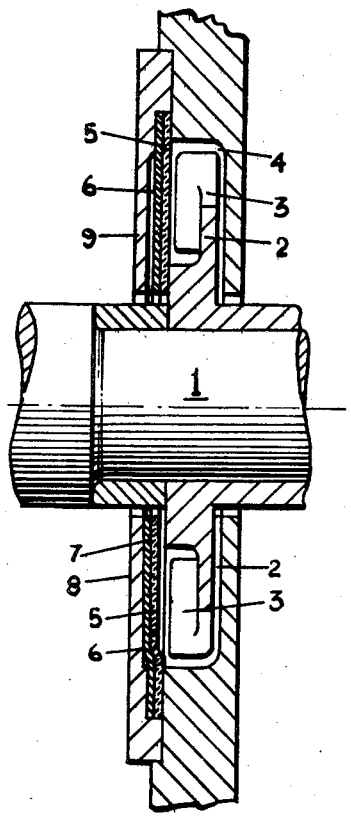
Fig. 2.
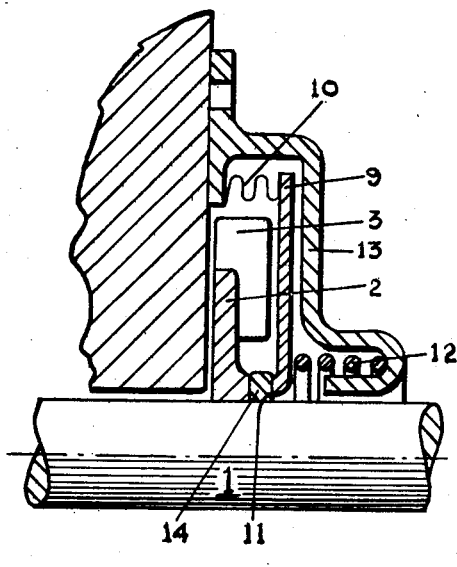
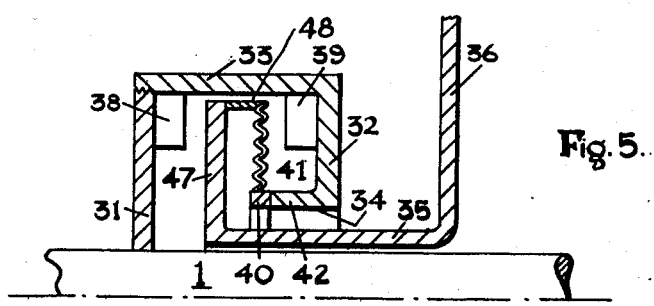
Fig. 5.
Ulrich Max Willi Barske
Inventor
By Albert F. Nathan
Atty July 28, 1953  U. M. W. BARSKE  2,646,999
FLUID SEAL Filed Jan. 19, 1949  2 Sheets-Sheet 2

Ulrich Max Willi Barske
Inventor
By Albert F. Nathan Atty

Patented July 28, 1953

2,646,999

UNITED STATES PATENT OFFICE 2,646,999

FLUID SEAL

Ulrich Max Willi Barske, Farnborough, England, assignor to Filton Limited, Leamington Spa, Warwickshire, England Application January 19, 1949, Serial No. 71,647
In Great Britain January 23, 1948

1 Claim. (Cl. 286—9)

This invention relates to seals for preventing leakage of fluid between the relatively rotating parts of machines such as pumps, turbines, electric motors and more particularly to seals (hereinafter called "liquid seals") in which upon rotating a liquid in an annular retaining channel a pressure is centrifugally generated in the liquid sufficient to prevent leakage of fluid through the said retaining channel.

The rotation of the liquid in the annular retaining channel may be caused by an impeller rotated within the annular retaining channel or it may be caused by rotating the walls of the said channel or by a combination of such methods. Liquid seals of the kind herein defined are known and are usefully employed for sealing purposes where friction losses must be reduced to a minimum but hitherto they have suffered from the disadvantage that leakage occurs when the centrifugally generated pressure falls below the leakage pressure, as, for example, when the speed of rotation is reduced or falls to zero.

Seals formed by co-operating members situated on the respective relatively rotatable parts of machines and pressed into contact with each other (hereinafter called "contact seals") are likewise known and do not suffer from the disadvantage mentioned in connection with liquid seals but they are a source of considerable wear and friction losses and these losses may become objectionable or even prohibitive in contact seals subject to high leakage pressures or high relative speeds of rotation or a combination of such conditions.

An object of the present invention is to provide an improved seal which shall consist of a liquid seal and a contact seal as hereinbefore mentioned whilst lessening the liability of parts such as diaphragms or flexible bellows being subject to undue distorting forces during rotation of the seal, and avoiding any necessity to make such parts unduly stiff to avoid such effects.

Another object of the invention is to employ a yielding wall of a channel into which liquid may be rotated and retained under centrifugally generated pressure to form the liquid seal and to operate the contact seal which wall may be a flexible diaphragm which in consequence of that arrangement may offer a large surface area to the static pressure and enable the diaphragm to be made more resilient.

A further object of the invention is to utilize the liquid so retained to counterbalance liquid media under pressure without rotating diaphragm or flexible bellows or like parts utilized in the seal at the speed necessary to create the centrifugally generated pressure.

I am aware of a form of liquid and contact seal wherein one member of the contact seal is rotatable with the means for causing the pressure centrifugally generated in the seal and the other is carried by one wall of the annular retaining channel formed as a floating piston provided with sealing rings which seal the escape of the liquid under the pressure centrifugally generated, and an object of my invention is to provide that the wall which forms or carries the other of said co-operating members of the contact seal is flexible and is constrained against movement bodily and yields by flexure to reduce or eliminate the contact pressure between and the leakage pressure at the co-operating members so that the additional seal necessary when such a piston is employed is obviated.

Some examples of fluid seals in accordance with the invention are illustrated by the accompanying drawings, in which:

Figure 1 represents a vertical section through a seal, the parts above the centre line of the shaft being shown in the relative positions occupied under static conditions and those below the centre line being shown in the relative positions occupied under rotational conditions.

Figure 2 is a sectional view, similar to that of the top half of Figure 1, of a modified form of the seal shown in Figure 1.

Figure 5 is a sectional view of the upper half of a seal in which the liquid seal is produced by the rotation of the walls of the liquid-retaining channel.

Figure 3:
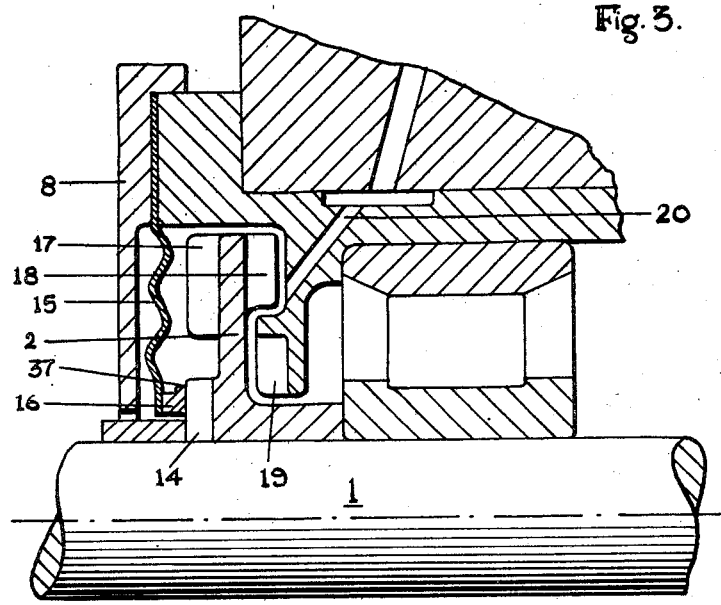
Figure 3 is a sectional view, similar to that of Figure 2, of part of a seal for a pump shaft bearing and intended primarily for use in cases where low internal pressures obtain under rotational conditions

In the arrangement shown in Figure 1, the shaft 1 of the machine to be sealed carries an impeller which comprises a disc 2 formed with vanes 3 and which is rotatable within a space formed by an annular recess 4 in the outer face of the casing of the machine. The recess is closed, under static conditions (see upper half of the figure) by a rubber or other flexible annular diaphragm 5, the inner circumferential portion of which is pressed toward a hub portion 7 of the impeller disc by flat springs 6, 6 which form part of a flat disc type spring. The diaphragm and spring disc are clamped against the casing by a cover plate 8.

Under static or low speed conditions, leakage of fluid from the interior of the machine is prevented by the sealing contact between the diaphragm and the hub portion of the impeller. As the speed of the shaft increases fluid present in the recess is flung radially outward by the centrifugal action of the vanes and an annulus of fluid under pressure is formed within the recess; the arrangement is such that the pressure of the fluid not only balances the fluid pressure within the machine, preventing leakage, but also acts to distort the diaphragm, against the action of the springs 6, 6 to reduce the pressure of contact with the hub portion of the impeller, or even completely to break the contact (see the lower half of the figure). As shown in the drawing, the vanes not only extend radially beyond the disc but are also formed on the face of the disc adjacent the diaphragm; this expedient facilitates the production of the fluid pressure requisite both to balance the internal pressure and to effect distortion of the diaphragm.

In the modified arrangement shown in Figure 2, the flexible diaphragm is replaced by a substantially rigid annular plate 9 carried by a metal bellows 10 and having an inner circumferential rim 11; a spring 12, abutting against a cover plate 13, urges the rim 11 toward sealing contact with a ring 14 abutting against the hub portion of the impeller. In this form, the plate 9 moves as a whole under the action of the centrifugally produced pressure or of the spring 12, the movement being accommodated by expansion or contraction of the bellows.

It will be noted that no recess (equivalent to that shown at 4 in Figure 1) is provided in this case, the working space for the impeller (that is to say the liquid retaining channel) being defined by the plate 9, the bellows 10 and the outer face of the casing. This feature renders the construction according to Figure 2 particularly suitable for application to existing machinery and it will be appreciated that all the other constructions shown in the drawings could easily be adapted, by suitable modification, for such application.

The seal for a pump bearing illustrated by Figure 3 includes a corrugated metal diaphragm 15 carrying a sealing ring 16 which has a lip or flange 37; the resilience of the diaphragm is sufficient to enable it, without the assistance of separate spring means, to maintain sealing pressure, under static conditions, between the sealing ring 16 and the rotary ring 14. The impeller has vanes 17 and 18 on both faces of the disc 2, the vanes 17 adjacent the diaphragm being of greater radial length and none of the vanes projecting radially beyond the disc. Stationary vanes 19 are formed on the pump casing and the latter is drilled, as at 20, to provide an oil feed passage for the bearing. In this construction, the greater radial length of the vanes 17 is employed to facilitate the production, by centrifugal action on the oil under rotational conditions, of a pressure sufficient not only to balance the internal pressure but also to distort the diaphragm. The continuation of the disc to the periphery of the impeller is for the purpose of preventing inward leakage from atmosphere under the low internal pressure obtaining under certain conditions of flow through the pump. The stationary vanes 19 are provided to prevent rotation of oil in the neighbourhood of the shaft. The lip 37 on the sealing ring is provided to catch oil which may adhere to the inner face of the diaphragm and, which, not being brought into rotation by the impeller, tends to creep down towards the shaft; in the absence of the lip, such oil might escape when the ring 16 was held out of sealing contact by the centrifugally produced pressure.

Figure 4:
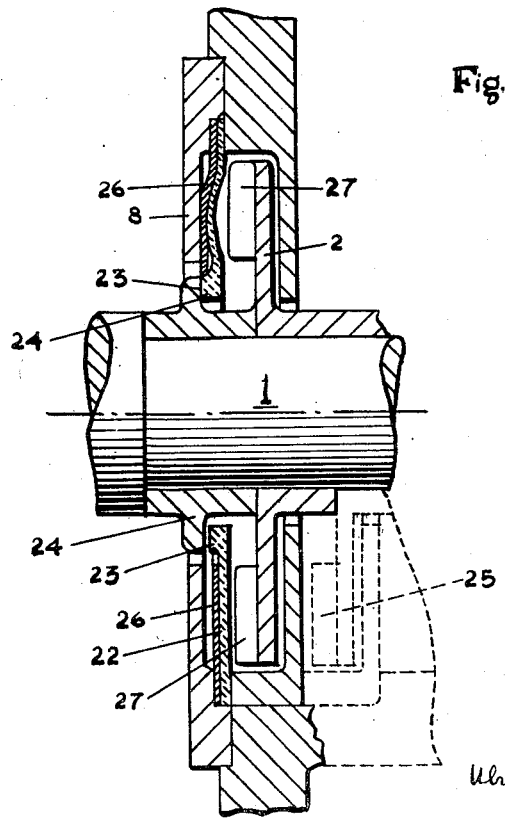
Figure 4 is a sectional view, similar to that of Figure 1, of a seal intended for use in cases where high internal pressures obtain under static conditions.

In all the constructions so far described, the centrifugally produced pressure reduces the pressure of contact, between the relatively rotating parts of the contact seal, by acting in opposition to a resilient force urging the said parts together. An example of an arrangement in which the relatively rotatable parts of the contact seal are adapted to be urged together by the leakage pressure is shown in Figure 4. In this construction, the contact seal is provided by a flexible diaphragm 22 arranged, upon distortion by the internal static pressure (see upper half of the figure) to make contact, by its sealing rim 23, with a flange 24 on the shaft 1; the distortion of the diaphragm is opposed by (springs) 26, 26. Under rotational conditions, the pressure produced by the impeller balances the internal pressure and the total fluid pressure acting on the inner face of the diaphragm is considerably reduced. Under these circumstances the springs 26, 26 are able to cause the rim 23 to recede from the rotary flange (see lower half of the figure).

Since the centrifugally produced pressure is required, in this case, merely to balance the internal pressure, an excess of pressure being undesirable, a simple impeller is employed having vanes 27 on the outer face only of the disc 2.

Constructions of the kind illustrated by Figure 4 may be preferred in cases where the internal static pressure is high and the resilient force required to maintain a contact seal of the kind shown in the earlier figures would be so high that unduly large fluid friction would be involved in the production of a fluid pressure sufficient to overcome it.

Where the internal pressure, under rotational conditions, is high, or where limitation of impeller radius is particularly important, any of the constructions described may be modified by the employment of a series of impellers. Such a modification is illustrated, by way of example, in the lower half of Figure 4, where a second impeller is indicated, by dotted lines, at 25.

In the arrangement illustrated by Figure 5 the liquid-retaining channel is defined by a casing carried by the shaft 1 and comprising disc-like walls 31 and 32 connected by a cylindrical wall 33; the wall 31 is rigidly carried by the shaft, whilst the wall 32 is apertured at 34 to clear a sleeve 35 which surrounds the shaft 1; the sleeve projects from the machine casing 36 and houses a disc-like barrier member 47 situated within the casing 31, 32, 33. Vanes for the production of the liquid seal are formed on the inner faces of the walls 31 and 32 at 38 and 39 respectively and the contact seal is formed by a sealing ring 40 on a resilient diaphragm 41 carried by a thin cylindrical wall 48, and a co-operating sealing ring 42 carried by the wall 32. In a modification (not illustrated) of this arrangement, the wall 32 could be in the form of a resilient (or spring-pressed flexible) diaphragm bearing a sealing ring adapted to co-operate with a sealing ring carried by the barrier member, suitable stop means being provided to limit the distortion of the diaphragm under the action of the centrifugally-produced pressure.

Seals in accordance with the invention may be used to prevent leakage of both liquids and gases.

While I have herein shown and described my invention, it will be appreciated that the invention may be embodied in other forms without departing from the spirit and scope thereof.

I claim:

A fluid pressure actuated seal for preventing the leakage of fluid between the relatively rotating parts of a shaft and housing, said seal comprising relatively rotatable co-operating parts for forming a contact seal and an annular retaining channel adapted to permit of access of a liquid thereto while said co-operating parts are in engagement, impeller means within said annular retaining channel adapted to rotate with said shaft and generate centrifugally a pressure in said liquid in said channel, a rigid annular plate having an inner circumferential rim, a ring abutting said impeller and engaging said circumferential rim in sealing operation, a cover plate, bellows connecting said cover plate and said annular plate, spring means within said cover plate biasing said annular plate against bodily movement and yielding to said centrifugal pressure to cause contact pressure between and the leakage pressure at the co-operating parts to be reduced or eliminated.

ULRICH MAX WILLI BARSKE.

References Cited in the file of this patent

UNITED STATES PATENTS

| Number | Name | Date |
|---|---|---|
| 1,695,320 | Carrier | Dec. 18, 1928 |
| 1,715,597 | Haug | June 4, 1929 |
| 1,932,214 | Hornschuch | Oct. 24, 1933 |
| 2,258,527 | Warman | Oct. 7, 1941 |
| 2,407,285 | King | Sept. 10, 1946 |
| 2,461,655 | Noble | Feb. 15, 1949 |